(12) United States Patent
Philips et al.

(10) Patent No.: US 7,530,094 B2
(45) Date of Patent: May 5, 2009

(54) METHOD AND APPARATUS FOR FACILITATING SINGLE SIGN-ON OF AN APPLICATION CLUSTER

(75) Inventors: Andrew B. Philips, San Francisco, CA (US); Marilyn Joyce Schneider Hollinger, Milbrae, CA (US)

(73) Assignee: Oracle International Corporation, Redwood Shores, CA (US)

( * ) Notice: Subject to any disclaimer, the term of this patent is extended or adjusted under 35 U.S.C. 154(b) by 709 days.

(21) Appl. No.: 10/405,434

(22) Filed: Apr. 1, 2003

(65) Prior Publication Data

US 2004/0199794 A1    Oct. 7, 2004

(51) Int. Cl.
G06F 7/04 (2006.01)
G06F 17/30 (2006.01)
G06K 9/00 (2006.01)
H04L 9/32 (2006.01)

(52) U.S. Cl. .................................................. 726/2
(58) Field of Classification Search .............. 726/1, 726/2

See application file for complete search history.

(56) References Cited

U.S. PATENT DOCUMENTS

| | | | | |
|---|---|---|---|---|
| 6,178,529 B1 * | 1/2001 | Short et al. | ................... | 714/51 |
| 6,453,362 B1 * | 9/2002 | Bittinger et al. | ............. | 719/316 |
| 6,549,538 B1 * | 4/2003 | Beck et al. | ............. | 370/395.52 |
| 6,954,792 B2 * | 10/2005 | Kang et al. | .................. | 709/229 |
| 2002/0062262 A1 * | 5/2002 | Vasconi et al. | ................. | 705/26 |
| 2003/0149781 A1 * | 8/2003 | Yared et al. | .................. | 709/229 |
| 2003/0226036 A1 * | 12/2003 | Bivens et al. | ............... | 713/201 |
| 2004/0015725 A1 * | 1/2004 | Boneh et al. | ................. | 713/201 |
| 2004/0128546 A1 * | 7/2004 | Blakley et al. | ............... | 713/201 |
| 2004/0193482 A1 * | 9/2004 | Hoffman et al. | ............... | 705/14 |

* cited by examiner

*Primary Examiner*—Kambiz Zand
*Assistant Examiner*—Farid Homayounmehr
(74) *Attorney, Agent, or Firm*—Park, Vaughan & Fleming LLP; Edward J. Grundler

(57) ABSTRACT

One embodiment of the present invention provides a system that facilitates single sign-on of an application cluster, wherein the application cluster includes a plurality of computer applications residing on the same computer system. The system operates by first receiving a logon request at a server from the application cluster, wherein the logon request specifies an account for the server. Next, the system authenticates the application cluster to the server and determines if the application cluster is authorized to use the specified account. If so, the system authorizes the application cluster to use the specified account.

18 Claims, 3 Drawing Sheets

METHOD AND APPARATUS FOR FACILITATING SINGLE SIGN-ON OF AN APPLICATION CLUSTER

BACKGROUND

1. Field of the Invention

The present invention relates to distributed computing systems. More specifically, the present invention relates to a method and an apparatus for facilitating single sign-on of an application cluster to multiple server computer systems.

2. Related Art

As distributed computing systems continue to evolve, it is becoming increasingly more common to locate applications on middle-tier systems. These middle-tier systems are accessed by clients and rely on backend servers to provide persistent storage and other services to the applications.

For example, FIG. 1 illustrates a distributed computing system including clients 101, middle-tier systems 103, and backend servers 105. Computer users (not shown) interact with clients 118 and 120 to access the various applications available on the middle-tier systems 103.

Middle-tier systems 103 include application clusters 102, 104, 106, and 108, which each host multiple applications, some of which may be duplicated on multiple application clusters. For example, application clusters 102 and 106 both host applications A1 and A2, while application clusters 102, 104, 106, and 108 all host applications A3 and A4.

Referring to the right-hand side of FIG. 1, databases 110, 112, and 114, and directory service 116 provide persistent storage and other services to application clusters 102, 104, 106, and 108.

Although distributing functionality between middle-tier systems 103 and backend servers 105 in this way has a number of advantages, it can greatly complicate security problems. For example, in FIG. 1 a client 118 can authenticate and access an application A3 in application cluster 102, as is illustrated by line 130. At the same time, client 120 can also access application A3 in application cluster 104 (across line 132).

When application A3 in application cluster 102 requires access to database 112, application A3 authenticates to a database requesting access to a schema associated with database 112, as is illustrated by line 124 in FIG. 1. This authentication process typically involves using a schema name and a password. Application A3 in application cluster 104 can subsequently access the same schema within database 112 using the same schema name and the same password, as is represented by line 126 in FIG. 1. Similarly, application A1 can access a schema within database 110 (across line 122) using a schema name and password for the desired schema. This schema name and password can be different than the schema names and passwords on lines 124 and 126. Application A1 in application cluster 106 can also access directory service 116 (across line 128) possibly using a distinguished name (DN) and a password.

While the mechanisms described above provide the required access to the backend servers, they have several drawbacks. Each application uses the same password to access a given schema, regardless of where the application resides. Additionally, each schema has a unique password. Hence, every application that needs access to multiple schemas must maintain multiple schema/password pairs—one for each schema. This proliferation of passwords creates password distribution and maintenance problems.

For example, updating the password for application A3 to access a given schema on database 112 requires that the password be changed simultaneously at a minimum of five locations—database 112, and application A3 in application clusters 102, 104, 106, and 108. Moreover, storing the same password at multiple application clusters is detrimental to system security, because a security breach at one application cluster potentially allows access to a large number of database schemas, and provides no clues as to which application cluster was compromised. The number of passwords in this example is approximately the number of installations times the number of applications times the number of backend servers. This is an extremely large number of passwords to maintain.

Hence, what is needed is a method and an apparatus that facilitates authenticating applications accessing backend servers without the problems listed above.

SUMMARY

One embodiment of the present invention provides a system that facilitates single sign-on of an application cluster, wherein the application cluster includes a plurality of computer applications residing on the same computer system. The system operates by first receiving a logon request at a server from the application cluster, wherein the logon request specifies an account for the server. Next, the system authenticates the application cluster to the server and determines if the application cluster is authorized to use the specified account. If so, the system authorizes the application cluster to use the specified account.

In a variation of this embodiment, authenticating the application cluster to the server involves verifying an authentication credential supplied by the application cluster.

In a further variation, verifying the authentication credential involves requesting a credential verifier from a directory service, challenging the application cluster with the credential verifier, examining a response to this challenge, and if the response is valid, accepting the authentication credential.

In a further variation, determining if the application cluster is authorized to use the specified account involves requesting authorization from a directory service, receiving a response from the directory service, and if an authorization is contained in the response, granting access to the application cluster.

In a further variation, authenticating the application cluster to the server involves providing an account name and an account password for the specified account.

In a further variation, applications hosted by the application cluster share a common authentication credential.

In a further variation, the database includes a directory server.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Distributed Computer System

Figure 1:
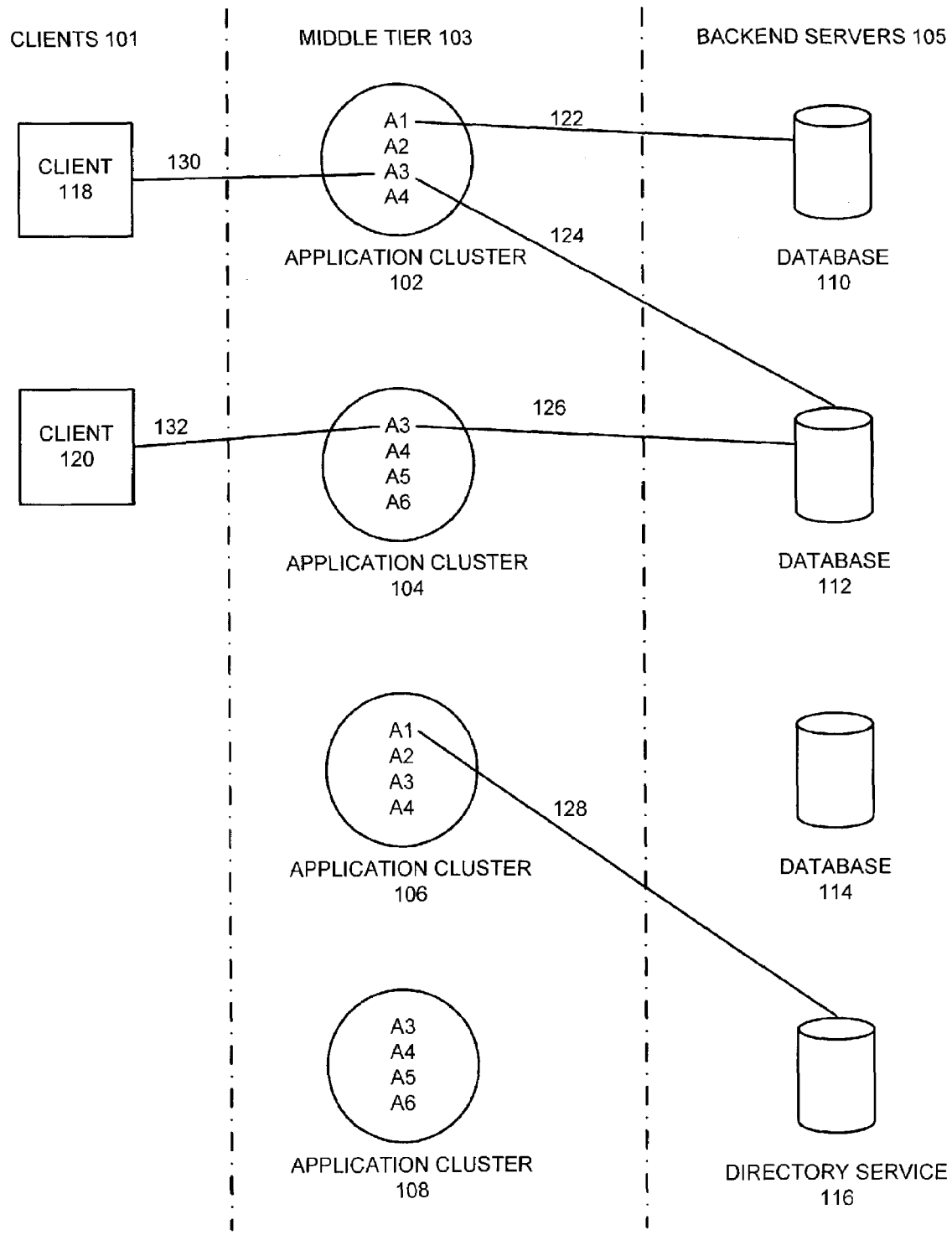
FIG. 1 illustrates a distributed computer system including clients, middle-tier systems, and backend servers.
Figure 2:
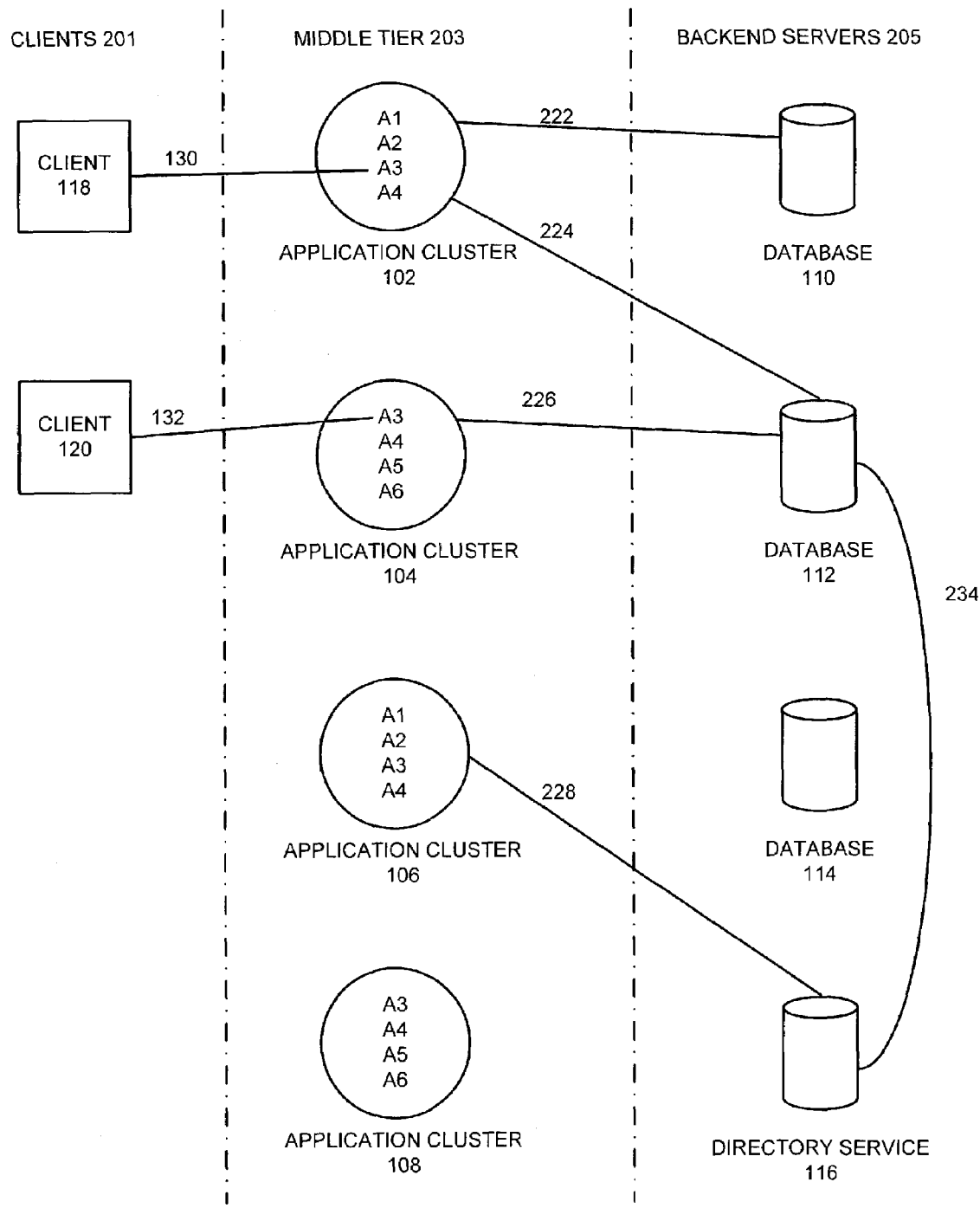
FIG. 2 illustrates a distributed computing system including clients, middle-tier systems, and backend servers in accordance with an embodiment of the present invention.

FIG. 2 illustrates a distributed computer system including clients 201, middle-tier systems 203, and backend servers 205 in accordance with an embodiment of the present invention. Clients 118 and 120, application clusters 102, 104, 106, and 108, databases 110, 112, and 114, and directory service 116 are similar to computing devices described above in conjunction with FIG. 1. Additionally, clients 118 and 120 access applications in middle-tier systems 203 as is represented by lines 130 and 132.

Each application cluster has a unique authentication credential used to access a database. The authentication credential can include an identifier and a password, a Kerberos ticket, a PKI certificate, or other authentication credential. For example, an application hosted on application cluster 102 requesting access to database 110, 112, or 114, or access to directory service 116 provides the application cluster identity and password to the respective backend server. Thus, the identity and password on lines 222 and 224 are identical, while the identity and password on line 226 are both different from those on lines 222 and 224. Likewise, the identity and password on line 228 are different from each of the above identities and passwords. Assigning passwords in this manner greatly reduces the number of passwords in the system and provides a means for determining which server's security was breached in case of an unauthorized entry to the system. The number of passwords in this system is approximately the sum of the number of installations plus the number of applications plus the number of backend servers.

After application cluster 102 has been authenticated to database 112, database 112 can access directory service 116 (across line 234) to determine if the specific application from application cluster 102 is allowed to access a given schema on database 112. Alternatively, application cluster 102 can authenticate to directory service 116 and can retrieve a schema/password pair from directory service 116 to be used in accessing the given schema on database 112.

Authenticating to a Database Schema

Figure 3:
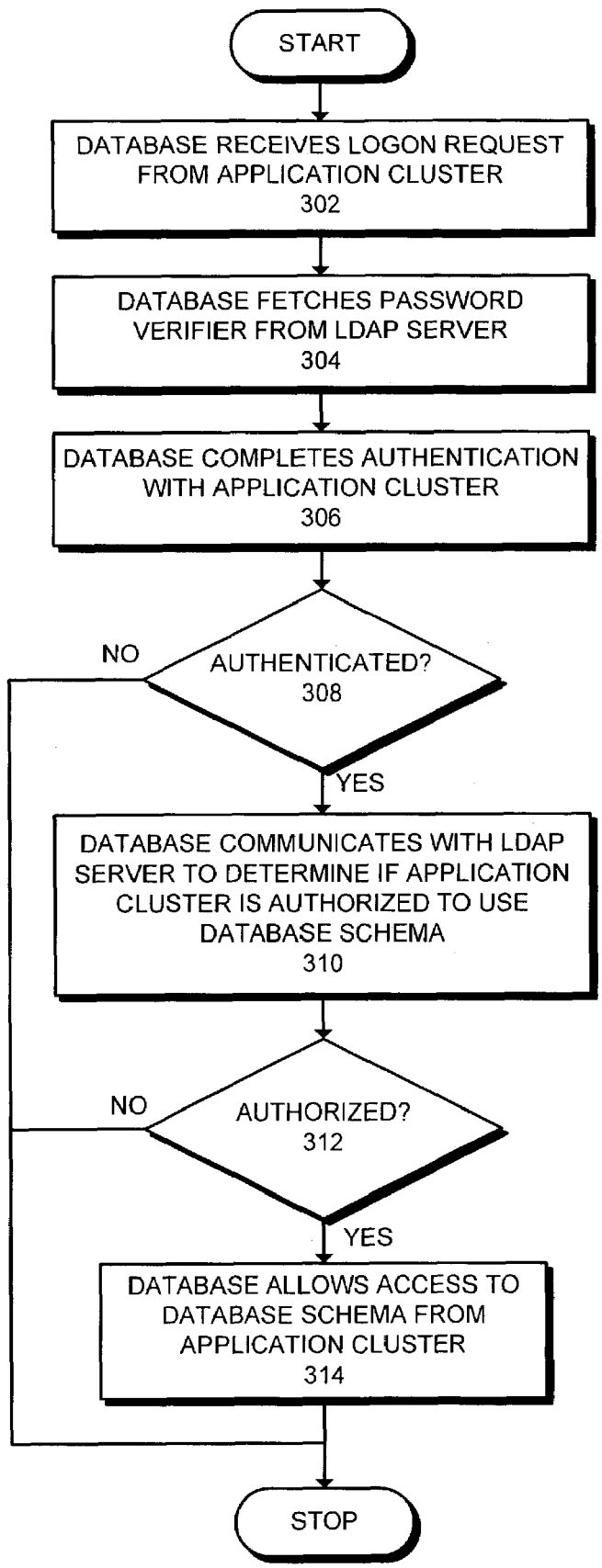
FIG. 3 presents a flowchart illustrating the process of authenticating an application cluster to a database schema in accordance with an embodiment of the present invention.

FIG. 3 presents a flowchart illustrating how an application cluster authenticates to a database schema in accordance with an embodiment of the present invention. The system starts when a database receives a logon request from an application cluster (step 302). This request includes an identifier for the application cluster and an associated password. Next, the database fetches a password verifier from a directory service (step 304). In one embodiment of the present invention, the directory service is a lightweight directory access protocol (LDAP) service. The database then completes the authentication with the application cluster (step 306). Note, the challenge/response system for completing the authentication using the password verifier is well known in the art and will not be discussed further herein.

The system then determines if the application cluster was authenticated by the authentication process (step 308). If not, the process is terminated. Otherwise, the database communicates with the LDAP server to determine if the application cluster, or the specified application, is authorized to use the data base schema (step 310). If the LDAP server responds that the application is not authorized to use the schema, the process is terminated (step 312). Otherwise, the database allows access to the database schema from the application cluster (step 314).

Note that many forms of authentication can be used. In one embodiment of the present invention, the application cluster provides a user name and a password to the backend server. The backend server then authenticates the application cluster using the user name and password.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating single sign-on of an application cluster, wherein the application cluster hosts a plurality of computer applications on the same computer system, the method comprising:

receiving a logon request at a database server from a specific application in the application cluster,
wherein the logon request specifies the application cluster and an authentication credential for the server,
wherein the application facilitates a user client system to access the database server, and
wherein the application cluster resides in a middle-tier system that is different from the database server as well as the user client system;

authenticating the application cluster to the server using the authentication credential, wherein the plurality of computer applications within the application cluster share a common authentication credential that is unique to the application cluster;

subsequent to authenticating the application cluster, accessing a directory service on a directory server to determine if the specific application is authorized to access a given database schema on the database server; and if so, authorizing the specific application to access the database schema.

2. The method of claim 1, wherein the directory service is a lightweight directory access protocol (LDAP) service.

3. The method of claim 1, wherein verifying the authentication credential involves:

requesting a password verifier from a directory service;
challenging the application cluster with the password verifier;
examining a response to this challenge; and
if the response is valid, accepting the authentication credential.

4. The method of claim 1, wherein determining if the application cluster is authorized to use the specified account involves:
- requesting authorization from a directory service;
- receiving a response from the directory service; and
- if an authorization is contained in the response, granting access to the application cluster.

5. The method of claim 1, wherein authenticating the application cluster to the server involves providing an account name and an account password for the specified account.

6. The method of claim 1, wherein the authentication credential includes a Kerberos ticket or a public-key infrastructure (PKI) certificate.

7. A computer-readable storage medium storing instructions that when executed by a computer cause the computer to perform a method for facilitating single sign-on of an application cluster, wherein the application cluster hosts a plurality of computer applications on the same computer system, the method comprising:
- receiving a logon request at a database server from a specific application in the application cluster,
  - wherein the logon request specifies the application cluster and an authentication credential for the server,
  - wherein the application facilitates a user client system to access the database server, and
  - wherein the application cluster resides in a middle-tier system that is different from the database server as well as the user client system;
- authenticating the application cluster to the server using the authentication credential, wherein the plurality of computer applications within the application cluster share a common authentication credential that is unique to the application cluster;
- subsequent to authenticating the application cluster, accessing a directory service on a directory server to determine if the specific application is authorized to access a given database schema on the database server; and
- if so, authorizing the specific application to access the database schema.

8. The computer-readable storage medium of claim 7, wherein the directory service is a lightweight directory access protocol (LDAP) service.

9. The computer-readable storage medium of claim 7, wherein verifying the authentication credential involves:
- requesting a password verifier from a directory service;
- challenging the application cluster with the password verifier;
- examining a response to this challenge; and
- if the response is valid, accepting the authentication credential.

10. The computer-readable storage medium of claim 7, wherein determining if the application cluster is authorized to use the specified account involves:
- requesting authorization from a directory service;
- receiving a response from the directory service; and
- if an authorization is contained in the response, granting access to the application cluster.

11. The computer-readable storage medium of claim 7, wherein authenticating the application cluster to the server involves providing an account name and an account password for the specified account.

12. The computer-readable storage medium of claim 7, wherein the authentication credential includes a Kerberos ticket or a public-key infrastructure (PKI) certificate.

13. An apparatus for facilitating single sign-on of an application cluster, wherein the application cluster hosts a plurality of computer applications on the same computer system, comprising:
- a receiving mechanism configured to receive a logon request at a database server from a specific application in the application cluster,
  - wherein the logon request specifies the application cluster and an authentication credential for the server,
  - wherein the application facilitates a user client system to access the database server, and
  - wherein the application cluster resides in a middle-tier system that is different from the database server as well as the user client system;
- an authenticating mechanism configured to authenticate the application cluster to the server using the authentication credential, wherein the plurality of computer applications within the application cluster share a common authentication credential that is unique to the application cluster;
- a determining mechanism, wherein, subsequent to authenticating the application cluster, the determining mechanism is configured to determine if the specific application is authorized to access a given database schema on the database server; and
- an authorizing mechanism configured to authorize the specific application to access the database schema if the specific application is authorized to use the specified account.

14. The apparatus of claim 13, wherein the directory service is a lightweight directory access protocol (LDAP) service.

15. The apparatus of claim 13, further comprising:
- a requesting mechanism configured to request a password verifier from a directory service;
- a challenging mechanism configured to challenge the application cluster using the password verifier;
- an examining mechanism configured to examine a response to this challenge; and
- an accepting mechanism configured to accept the authentication credential if the response is valid.

16. The apparatus of claim 13, further comprising:
- a requesting mechanism configured to request authorization from a directory service;
- a receiving mechanism configured to receive a response from the directory service; and
- a granting mechanism configured to grant access to the application cluster if an authorization is contained in the response.

17. The apparatus of claim 13, wherein authenticating the application cluster to the server involves providing an account name and an account password for the specified account.

18. The apparatus of claim 13, wherein the authentication credential includes a Kerberos ticket or a public-key infrastructure (PKI) certificate.

* * * * *

UNITED STATES PATENT AND TRADEMARK OFFICE
CERTIFICATE OF CORRECTION

PATENT NO. : 7,530,094 B2  Page 1 of 1
APPLICATION NO. : 10/405434
DATED : May 5, 2009
INVENTOR(S) : Andrew B. Philips et al.

It is certified that error appears in the above-identified patent and that said Letters Patent is hereby corrected as shown below:

On the Title Page, Item (75), in "Inventors", line 3, delete "Milbrae" and insert -- Millbrae --, therefor.

Signed and Sealed this

Twenty-fifth Day of May, 2010

David J. Kappos
*Director of the United States Patent and Trademark Office*